Patented Oct. 12, 1954

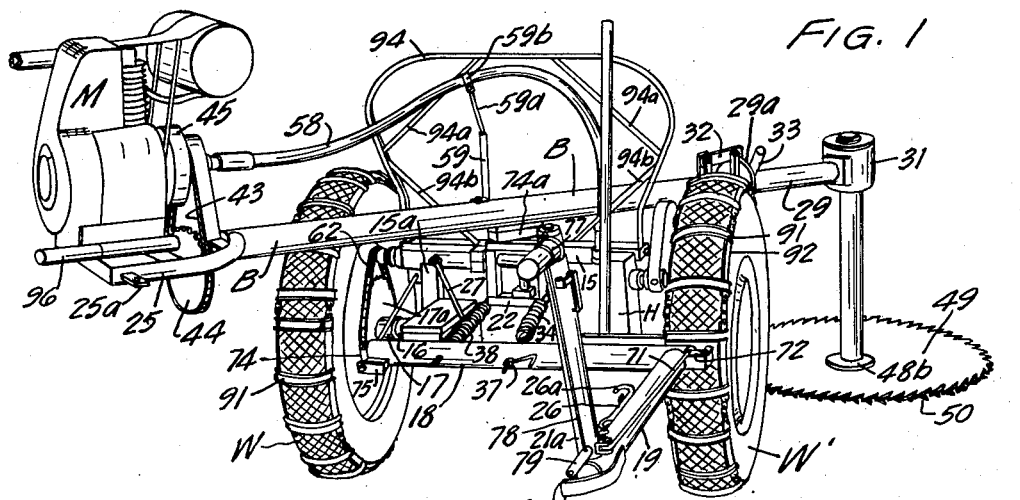

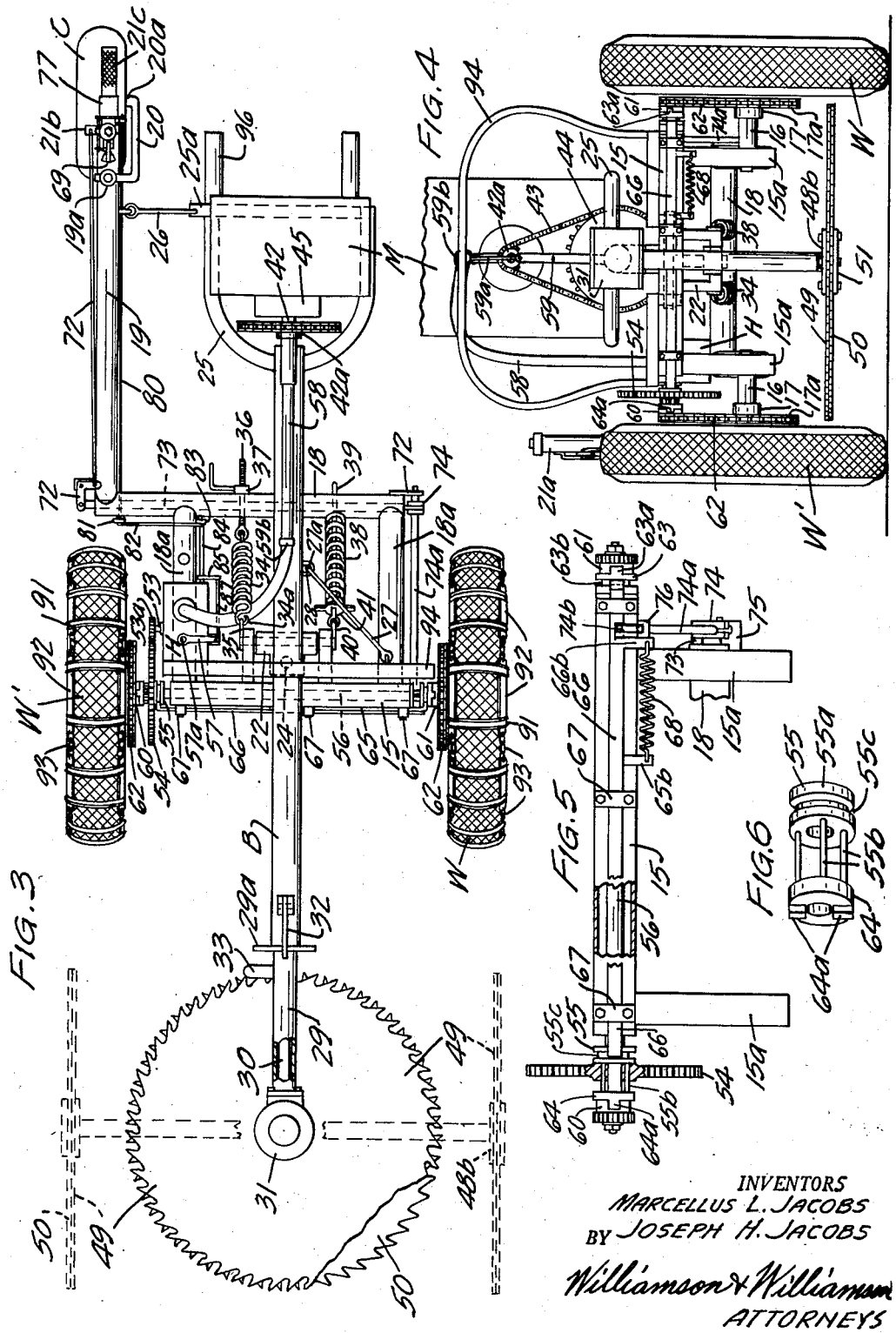

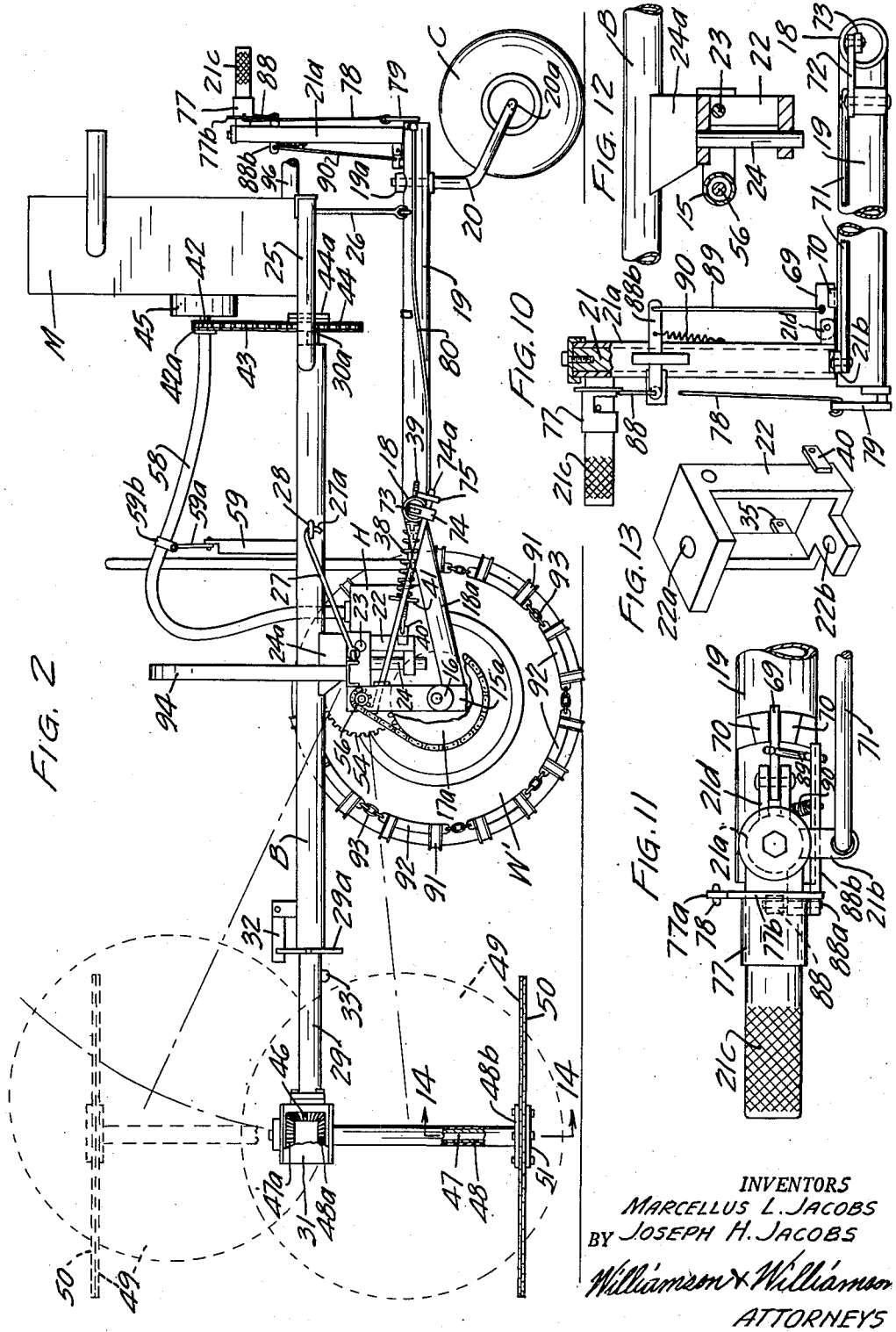

2,691,393

UNITED STATES PATENT OFFICE 2,691,393

POWER SAW MACHINE (MOBILE, SELF-PROPELLED)

Marcellus L. Jacobs and Joseph H. Jacobs, Minneapolis, Minn.

Application August 30, 1951, Serial No. 244,368

7 Claims. (Cl. 143—43)

This invention relates to a mobile, preferably self-propelled, power saw machine for quickly cutting standing or felled timber, branches or piles of boards or sticks and is an improvement in a number of respects upon the machines, structures and apparatus disclosed in our co-pending applications for United States patent, to wit, S. N. 87,892, filed April 16, 1949, entitled "Portable Power Saw" and issued January 5, 1954 as Patent No. 2,664,925, and S. N. 95,332, filed May 25, 1949, entitled "Power Saw—Automotive Type."

It is an object of our present invention to provide a highly efficient, mobile saw machine of the class defined which through combination of oppositely driven, twin rotary saws attached and mounted upon a free moving swing beam having improved mounting support upon a vehicle frame, obtains important new functional advantages in sawing timber, branches and sticks under a great variety of conditions as contrasted with the prior art and even over and above the inventions of our earlier patent applications.

A more specific object of our invention is the provision of a free moving swing beam or support arm medially mounted in trunnions and pivots from the mobile vehicle and supporting oppositely rotating twin saws at the forward end thereof ahead of the vehicle and so constructed and related that the beam and consequently the saw mechanism at the end thereof, may be freely swung without restriction through various paths on a horizontal axis and through various paths on a vertical axis; this combination including the two oppositely driven rotary saws enabling an operator with a balanced beam to manipulate and direct the saw for cutting against logs, limbs, piled pieces and the like without any danger of transmission of torque to the supporting beam or vehicle frame or without any jumping, jerking or grabbing action inflicted upon the timber, branches or sticks.

Another object is the provision of improved finger tip controls for directing sawing movements of the sawing unit and for positioning and maintaining the saw blades in various cutting positions as well as for application of power to saw and to the propelling mechanism of the machine or vehicle frame.

It is a further object to provide a vehicle or automotive power saw machine which may be advanced by finger tip contol, withdrawn or reversed, wheeled sharply for turning in combination with a free swinging saw unit-supporting-beam whereby the controlled, directional travel of the automotive frame with the swinging beam and oppositely driven twin saws cooperate to unitary and valuable results in cutting brush, clearing a trail and also in sawing standing and felled timber and branches.

With our improved structure, a motor and hydraulic drive are related with the free moving saw-supporting-beam to nicely counterbalance the saw unit and improved controls are positioned outwardly and rearwardly of the motor to effect quick and easy manipulation of the beam as well as finger tip power control of directional propelling and turning of the vehicle unit.

A still further object is the provision of independently drivable traction wheels for the machine frame and improved controls for selectively applying power to the wheels in unison, forwardly or rearwardly or independently to the wheels for turning, thus increasing the maneuverability of the sawing machine and consequently the joint action obtained through mobility of the automotive frame and simultaneous swinging action of the saw-supporting beam.

Another object and feature is the construction of an automotive saw machine of the class described wherein the weight of all heavy parts, including motor, beam, driving connections and twin saws, is carried on a wheel-supported cross frame axis disposed only slightly above the axis of the large traction wheels, thus preventing the machine from tipping forward when going down hill or from pressing backwards excessively on the rear wheel or wheels when going up steep slopes. Substantially all of the weight is impressed upon the driving wheels of the machine for obtaining better traction over stumps, logs and irregular terrain.

Still another object is the provision of an improved chassis, vehicle frame and support for a beam-supported, oppositely-rotated twin saw unit, facilitating a very sharp turning of the machine and accommodating an operator directly behind the machine and furnishing no obstruction to substantially universal swinging action of the elongated saw-supporting beam for vertical and for horizontal cutting.

These and other objects and advantages of our invention will be more apparent from the following description made in connection with accompanying drawings, wherein like reference characters refer to similar parts throughout the several views and in which:

Fig. 1 is a rear perspective view of an embodiment of our improved automotive saw machine showing the saw-supporting-beam positioned with the twin saw unit below the same, horizontally for cutting close to the ground and swung to the right side of the front of the vehicle;

Fig. 2 is a side elevation of the same machine with the saw-supporting-beam disposed longitudinally of the automotive frame, dotted lines indicating varied adjustable positions of the saw unit obtainable through axial oscillation and maintenance of the saw-supporting-beam;

Fig. 3 is a top plan view of the machine shown in Fig. 2;

Fig. 4 is a front elevation of the same;

Fig. 5 is a detail view showing in rear elevation, with some portions broken away, the drive connections and transmission mechanism for driving selectively, the traction wheels from a source of power and as here shown, through the intermediary of a hydraulic gear type pump;

Fig. 6 is a detail perspective view showing one of the shiftable clutch elements of said wheel driving transmission;

Fig. 7 is a diagrammatic, perspective view showing hand and finger tip controls for selectively applying driving power to the traction wheels and for also conveniently adjusting or swinging the saw-supporting-beam and releasing the same;

Fig. 8 is a detail perspective view illustrating two of the cooperating link elements of the control mechanism, separated and spaced apart;

Fig. 9 is a detail, horizontal section taken axially through the driven saw unit shaft illustrating a suitable friction drive mechanism;

Fig. 10 is a detail side elevation with some portions broken away, showing the control mounting post at the rear right hand side of the vehicle with a finger tip control elements mounted thereon and some of the connections with operating levers and linkage;

Fig. 11 is a top plan view on a larger scale of the control mounting post and elements shown in Fig. 10;

Fig. 12 is a view mostly in cross section showing the details of the mounting of the saw-unit-supporting beam for swinging on both horizontal and vertical axes;

Fig. 13 is a detail perspective view showing a cradle member constituting a part of said mounting illustrated in Fig. 12; and Fig. 14 is a detail vertical section taken through the twin saws and their concentric stub shafts affixed to the saws.

As shown in the drawings, our automotive, power saw machine includes as one of its important cooperating mechanisms or parts, a self-propelled vehicle chassis, comprising a cross frame and a pair of relatively large co-axial, forward traction wheels W and W' and a rearwardly mounted caster wheel C, preferably mounted some distance behind one of the traction wheels to assist in stabilizing the frame and to afford wide clearance for swinging of the saw and motor supporting beam as well as for accommodation of the operator walking behind the cross frame.

The cross frame includes an inverted U-shaped stationary cross axle 15, having depending vertical axle extension legs 15a in which outwardly extending and axially aligned stub shafts 16 are fixed, said stub shafts at their outer ends having suitable wheel bearings mounted thereon. The wheels W and W' are journaled to said wheel bearings and connected with said bearings and said stub shafts to prevent axial displacement thereof and have affixed thereto sleeves or collars 17 which carry relatively large driven sprockets 17a.

The vehicle cross frame in addition to the stationary axle, includes a fixed rear tubular bar 18 disposed substantially at the level or slightly above the level of the traction wheel axes and connected with the cross frame axle 15 by two heavy, inclined side bars 18a or equivalent structure. A rear boom comprising as shown, a heavy, rigid metal tube 19 is welded, braced and rigidly affixed at its forward end to the cross bar 18 and extends horizontally and rearwardly some distance longitudinally of the machine to provide at its rear terminal portion, a vertical socket 19a in which the king bolt of a caster wheel mounting 20 is received, caster wheel C being journaled on the horizontal spindle 20a of said mounting. It will be noted, see Figs. 1 and 3, that in the embodiment illustrated the caster wheel is disposed at the right side of our machine, almost directly rearward of the right hand traction wheel W'. At the rear end of the frame boom 19, we rigidly mount an upstanding control-mounting post 21 which conveniently carries for accessibility, finger-control elements later to be described. A control-carrying sleeve 21a is mounted for oscillation on post 21.

Centrally of the inverted U-shaped axle bar 15, we supply a saw-beam-supporting structure which will enable the saw unit supporting beam B to be freely swung on a horizontal axis and to also be freely swung on a vertical axis, thereby providing almost universal connection of the saw supporting beam with its mounting frame. To this end, see Figs. 12 and 13 and 2 and 3, a cradle member or cage 22 of generally rectangular configuration having vertical aligned bearing apertures 22a and 22b through upper and lower horizontal flanges thereof is pivoted by horizontal trunnions 23 within a recess formed in the middle portion of the stationary axle. Trunnions 23 enable the cradle 22 to freely swing on a horizontal axis. The cradle 22 through bearing apertures 22a and 22b accommodates the heavy, vertical depending pivot pin 24 of the beam mounting block 24a.

The tubular elongated saw-supporting beam is welded or otherwise rigidly and medially affixed to the mounting block 24a and as shown, extends from a position substantially rearwardly of the rear cross bar 18 of the frame to a position substantially forward of the cross frame axle 15. A U-shaped, horizontally disposed motor supporting frame 25 is welded or otherwise rigidly affixed at its central portion to the rear end of beam B and has mounted thereon an upstanding motor M preferably of the internal combustion type having its power takeoff extending forwardly at the intermediate, lower portion thereof. To detachably retain beam B and motor support 25 against swinging on the vertical axis of the pivot pin 24, suitable means are provided such as the retaining link 26 swingably connected to the rear boom 19 and having its free or outer end provided with a hook 26a which is adapted to engage an aperture in a strap piece 25a affixed to the motor supporting frame 25.

A second retaining link 27, see Figs. 2 and 3, is swingably secured at its forward end to the forward portion of the cross frame and has a hook 27a at its free end adapted to engage an aperture in a strap piece 28 fixed to beam B at a point a few feet rearwardly from the horizontal trunnions 23. This link 27 extends diagonally of the frame when in use and retains the boom B against oscillation on a horizontal axis, i. e., upon the trunnions 23.

Boom B has concentrically mounted therein and extending from the forward end thereof, the elongated, saw-driving shaft housing 29 of tubular construction and provided with suitable bearings therewithin for journaling the saw-driving shaft 30. The construction of the saw driving shaft and its connected transmission mechanism within a short cylindrical vertical gear case 31, see Figs. 1 and 2 and the driving mechanism including an inner shaft 47 and an outer tubular shaft 48, is identical with the corresponding parts of my co-pending application, Serial No. 95,332 previously identified and therefore, need not be described in detail here. The elongated shaft housing 29 preferably extends the entire length of tubular beam B and has affixed to the forward portion thereof, a notched set collar 29a, which as shown, is provided with four circumferentially spaced, rather deep notches spaced 90 degrees apart. Each of the notches may be selectively engaged to retain the tubular housing 29 in a predetermined position with regard to beam B by a pivoted retaining dog 32. The dog 32 as shown, is pivoted to the upper side of beam B adjacent the forward extremity thereof and is swingable on a horizontal axis and extends longitudinally of the beam for proper engagement selectively with the notches of collar 29a.

To facilitate adjustment oscillation of the tubular shaft housing 29, we provide a radial rock arm 33 fixed to housing 29 as shown, just forwardly of the collar 29a.

We provide simple but efficient balance spring structure to yieldingly stabilize the beam B and consequently the saw unit, supported from the outer end thereon in the various tilted positions of the beam on its horizontal tilting axis provided by the horizontal trunnions 23 of the cradle. To this end, see Figs. 1, 2, 3 and 13, a heavy contractile spring 34 is interposed between the righthand side of the cradle and the rear cross bar of the frame having a hook 34a at the forward end thereof which engages an apertured strap 35 fixed to the lower right-hand corner of the cradle 22, while the rear and lower end of contractile spring 34 is adjustably connected to the rear bar 18 by an eye bolt 36 having a handle-provided, heavy retaining nut 37 threaded on the outer end thereof. By adjusting the retaining nut 37, the tension on spring 34 may be varied within the desirable limits.

Extending substantially parallel and on the left side of beam B, we provide a balancing compression spring 38 interposed between the left lower corner of the cradle 22 and the forward side of the rear bar 18. As shown, this compression spring is mounted on an eye bolt 39, the rear end of which slidably extends through a suitable bore formed in rear bar 18 and the eye of which at the forward end is swingably connected with a short retaining strap 40 fixed to the lower left corner of cradle 22. Adjustment of the compression of spring 38 is facilitated within the desired range by means of a small screw head piece 41 having threaded engagement with the forward portion of eye bolt 39 and bearing against the forward end of compression spring 38.

The power takeoff shaft 42 of motor M has fixed thereto a sprocket 42a which drives through an endless roller chain 43, a substantially larger sprocket 44 which is journaled on the rearward end 30a of the saw driving shaft 30 within the confines of the forward portion of the U-shaped motor support frame 25. Interposed for driving connection between the sprocket hub of sprocket 42a and power shaft 30 is a speed-responsive clutch of the fly-ball-lever type 45 such as was disclosed in my co-pending application, Serial No. 95,332. This clutch is constructed in such manner that fly weights will disengage the pulley or sprocket 42a from the motor drive shaft 42 when the speed of the engine is reduced, for example, to its normal idling speed.

As shown in Fig. 9, we provide a friction drive for the saw unit driving shaft 30 comprising a friction clutch mechanism 44a mounted on the large driven sprocket 44. This mechanism 44a includes a fixed plate 30b keyed to the forward end of shaft 30 and compressible clutch elements 44b, disposed at opposite sides of plate 30b. Spring urged compression means 44c are provided on the sprocket 44 urging the clutch disc 44b and plate 30b into frictional engagement.

The saw driving shaft 30, as in the construction disclosed in our co-pending application, Serial No. 95,332, has affixed to the forward end thereof, a beveled driving gear 46, see Fig. 2, which is intermeshed at opposite sides with oppositely driven beveled gears 47a and 48a respectively. Beveled gear 47a is affixed to the upper end of a short saw-carrying shaft 47 while the lower beveled gear 48a is affixed to the upper end of a tubular saw-carrying element 48, concentrically surrounding shaft 47. Suitable bearings are provided within the tubular shaft 48 for journaling the inner shaft 47. An attachment collar or saw arbor 48b is affixed to the lower extremity of tubular shaft 48 (see Figs. 2 and 14) and to the collar, a rotary disc saw 49 is affixed, as shown, in Fig. 14. The disc saw 49, it will be noted, in its center portion is of slightly concave-convex shape, the concavity opposing the concavity of the twin saw 50 which is keyed or otherwise non-rotatably connected with the lower end of the inner shaft 47. Superimposed below the axial portion of the outer saw 50 is a pressure collar 51 which is adjustably pressed inwardly by an adjustment nut 52, provision being made in nut 52, such as by set screw, for locking the same in an adjusted position. The arrangement of the cutting teeth and the two saws 49 and 50 and the relation thereof is preferably similar to the teeth specifically disclosed in my co-pending application, Serial No. 95,332, although it is to be understood that any suitable type of teeth may be employed.

It is a feature of my improved structure that the oppositely revolved twin saws 49 and 50 be mounted for pressure to be adjustably applied to their opposed concave portions whereby light frictional engagement is obtained between the saws at a circular zone disposed inwardly a short distance from their peripheral edges. This structure we have found is entirely successful in preventing spreading of the twin edges apart as the saw progresses into a log or tree. With our previous structures, disclosed in my co-pending application, there was a tendency for the tooth edges of the twin saws to spread apart, leaving a bead or clogging sometimes between the outer edges. Because of the resilience of the saw disc and the tension superimposed on the contacting zones, our improved structure clears a uniform and transversely continuous kerf between the cutting edges of the twin saws.

We prefer to controllably drive the traction wheels W and W' of the automotive saw machine forwardly, reversely and selectively in both directions through the intermediary of a very accurately controlled hydraulic drive mechanism interposed between the power takeoff 42 of the motor M and the traction wheels. To this end, we utilize a hydraulic transmission system indicated as an entirety by the letter H suitably supported from the vehicle chassis adjacent the fixed cross axle construction and having a box-like rectangular housing, see Figs. 2 and 3. This hydraulic mechanism may well be of the general type in construction of gear pump structure illustrated and described in our co-pending application, Serial No. 95,332, provided with a power takeoff stub shaft 53, see Fig. 3, which as shown, extends outward laterally from the transmission case housing and carries a fixed driving pinion 53a constantly intermeshed with a large driven gear 54 which is slidably related with a shiftable clutch member 55, illustrated in Fig. 6. The gear 54 is fixed to the driven cross shaft 56 which is journaled in suitable bearings below the upper medial portion of the stationary cross axle frame 15.

It will be understood that any suitable type of hydraulic transmission mechanism may be utilized or other mechanical transmission of a type preferably to provide through adjustability of one or more reciprocating or oscillatory members, variable driving speed ratios in forward and reverse direction as well as a lock relation with reference to the driven shaft 56. In the type of variable speed, hydraulic transmission mechanism H utilized the various speed ratios both for driving in forward and reverse, are obtained by swinging adjustment of a rocker arm 57 fixed to the upper end of an adjustment shaft 57a, see Figs. 3 and 7. The oscillation of the shaft 57a variably connects passages in the hydraulic transmission system to produce flow of hydraulic fluid in forward driving and reverse driving directions with variable speed flow in each instance.

Power is supplied to the hydraulic or other transmission system from the motor M as shown by means of a flexible driving connection housed in a tubular casing 58 of flexible construction. In the particular arrangement of power takeoff of the motor M on the side and forward location of the transmission housing, illustrated in the drawings, it is desirable to flexibly anchor the intermediate portion of the casing tube 58 by suitable means, as shown in Fig. 1, which may comprise an upstanding arm 59 fixed to the intermediate portion of beam B and having a swingable link 59a connected with an encircling strap 59b which is claimped to the tubular casing 58. The flexible drive within casing 58 is connected for driving with the stub power takeoff shaft 42 of motor M.

We provide instantly controllable, selective clutch mechanism to enable an operator to connect either the left or right traction wheels for driving and for sharp turning of the automotive machine as well as to normally connect both wheels for driving with the hydraulic transmission system H. To this end, right and left hand sprocket collars 60 and 61 respectively are freely journaled on the diminished ends of the driven shaft 56, see Figs. 3, 4 and 5, and the sprockets thereof are connected for driving by endless roller chains 62 with the large sprockets 17a which are fixed to the stub shafts 16 of the traction wheels W and W'. Each of the sprocket collars 61 and 60 at its rear or inner face, is provided with a pair of diametrically disposed lug-receiving recesses for receiving the complementary lugs 63a and 64a respectively of the lug-provided clutch collars 63 and 64. The clutch collar 63 is keyed for longitudinal sliding movement to the left end of the driven shaft 56 and its shifting is directly controlled by a shift bar 65, see Figs. 7, 8 and 5, bar 65 at its outer end being turned and properly contoured at its extremity 65a to engage the annular grooves 63b provided in the clutch collar 63. The right hand clutch collar 64 as shown, forms the outer portion of the slidable clutch member 55 and is connected rigidly with an inner shift collar 55a by means of a plurality of circumferentially spaced, longitudinal pins 55b which spaces collars 55a and 64 apart and which extend through suitable apertures formed in the large, driven gear 54, see Figs. 3 and 5. Clutch member 55 and the outer clutch collar 64, equipped with a pair of diametrically disposed clutch dogs 64a are shifted by means of a longer shift bar 66 disposed in side by side relation to the shorter shift bar 65 and mounted for relative sliding thereto in suitable keepers 67 bolted or otherwise connected to the front face of the upper portion of the stationary cross axle 15. Shift bar 66, like the bar 65 has its outer end turned and properly recessed to form an extremity 66a which engages an annular shipper groove 55c formed in the inner collar 55a of the shiftable clutch member 55. The shift bars 65 and 66 have fixed thereto, adjacent their inner ends, depending, rigid arms 65b and 66b respectively and said arms are interconnected and urged together by a contractile spring 68, the ends of which are provided with hooks engaging suitable apertures in said depending arms. In this connection, it will be noted that the shift bars 65 and 66 overlap and that the contractile spring 68 therefore, urges both bars outwardly, into clutch-engaging positions.

We provide extremely simple and highly efficient mechanism for controlling by hand and finger tip action of the operator, the various clutch shift operations as well as the widely variable operation of the hydraulic transmission unit.

Our machine and its wheeled frame are constructed and the parts combined and associated to provide for very full and unrestricted swinging of the elongated beam B in substantially a universal manner and further, to enable the operator to stand and walk behind the machine in position to look ahead and observe the conditions as well as the operation of the saws while controlling all adjustments and movements of the important working parts as well as the selective, variable speed driving of the traction wheels for forward, reverse and turning movement of the vehicle in motion.

To hand-control the shifting of shift bars 65 and 66 and consequently, clutch operation and connection of driving power to right and left traction wheels W, the control mounting sleeve 21a which is mounted for oscillation on vertical post 21 is connected by a lever arm 21b fixed to the lower end thereof through linkage, lever and rock shaft with the two shift bars 65 and 66. Control mounting sleeve 21a at its upper end has a radially extending rocker arm 21c fixed thereto and preferably extending rearwardly for convenient accessibility to the operator. Mounting sleeve 21a is retainable in intermediate position whereby clutch connection is made from the power takeoff of the hydraulic driving mechanism H with both of the traction wheels and is also retainable in clockwise or counterclockwise oscillation for right or left turning (application of driving power to left or right wheel respectively) by suitable means or mechanism. As shown, this mechanism comprises a vertically swingable retaining dog 69 pivoted in a forked bracket 21d fixed to the lower end of mounting sleeve 21a just above the horizontal rear boom 19 of the vehicle frame. The dog 69 is adapted to be seated between a pair of spaced, upstanding retaining lugs 70 affixed to the upper portion of the rear end of boom 19 and when so seated, through the connections with the shift bars 65 and 66, causes clutch or driving engagement of the two traction wheels with the driven shaft 56, see Figs. 7, 11 and 12. When dog 69 is raised and released from a position between the two lugs 70, the mounting sleeve 21a may be turned clockwise by manipulation of the rock arm 21c to pull upon the connection linkage, resulting in the retraction of shift bar 66 and consequently, release of clutch collar 64 from driving engagement for the right hand traction wheel. Release of the dog 69, after such clockwise oscillation of mounting sleeve 21a, retains the clutch mechanism in the adjusted position with application of power to the left traction wheel and consequently, produces a sharp right turn in the travel of our automotive device. The retaining dog 69 is then disposed outwardly in abutment against the right hand, upstanding retaining lug 70. With the retaining dog 69 released, the mounting sleeve 21a may be oscillated counterclockwise to retract the shift bar 65 and release driving engagement from the driven cross shaft 56 with the left traction wheel. Again, this adjusted oscillated position may be retained by abutment of the dog 69 with the upstanding left retaining lug 70 at the rear end of the boom 19.

While various linkage and connection mechanisms according to needs, may be applied between the lever arm 21b at the lower end of the vertical mounting sleeve and the shift bars 65 and 66, the linkage mechanism illustrated in Figs. 7, 12 and 3 is quite adaptable for the embodiment shown in the drawings and consists in the following: a rigid rod 71 connects the outer end of lever arm 21b with one arm of a horizontal bell crank lever 72 suitably fulcrumed on a bracket affixed to the forward portion of boom 19. Bell crank lever 72 has a forwardly extending arm which terminates at a point substantially axial of the hollow, rear cross beam 18 of the vehicle frame. A rigid link bar 73 extends longitudinally through the tubular cross beam 18 and as shown, has its left end twisted into vertical position for connection by pivot 73a with a rocker arm 74 which is fixed to a rock shaft 74a, the rear end thereof being journaled in a bracket 75 secured to the rear and left hand end of tubular cross beam 18. Rock shaft 74a as shown in Figs. 7 and 3, extends forwardly to the shift bars 65 and 66 and has its forward end journaled in a suitable bracket 76, affixed to the forward side of the cross axle construction at the left thereof. Rock shaft 74a terminates in a flat, upstanding shift key 74b which is received within overlapping, elongated notches 65c and 66c respectively of the two shift bars 65 and 66. The said notches are purposely elongated slightly over twice the thickness or width of shift key 74b to permit either of said shift bars to be retracted without releasing clutch engagement effected by the other shift bar. In other words, a lost motion connection is provided between the shift key 74b and the two shift bars, which when rock shaft 74a is oscillated in clockwise direction, retracts shift bar 65, releasing driving clutch for the left hand wheel, without effecting any shifting of shift bar 66 and consequently, the driving connection of the right traction wheel. Counter-clockwise oscillation of the rock shaft 74a, produces just the opposite reaction, releasing clutch engagement with the right hand wheel through retraction of the shift bar 66. When the rock shaft 74a is disposed with the key 74b in intermediate or upstanding position, as shown in Fig. 7, due to the elongated slots 65c and 66c of the two shift bars and the lost motion connection and the effect of contractile spring 68, both shift bars 65 and 66 are protracted to cause driving engagement to be made with both traction wheels, and at such time, the vertical mounting sleeve 21a is in the central position shown in the drawings, with the retaining dog 69 locked between the two retaining lugs 70, carried by the rear end of boom 19.

Finger tip control, conveniently accessible to the driver from the rigid rock arm 21c affixed to mounting sleeve 21a is provided in our structure, preferably including an oscillatory, small sleeve 77 journaled on the inner portion of rock arm 21c and also disposed for longitudinal shifting movement to release the retaining dog 69 of the clutch controlling mechanism. Said control will accurately and instantly enable the operator to adjust the hydraulic transmission mechanism to drive the wheels rearwardly or forwardly at variable speed ratios. To this end, the control sleeve 77 has a radial lever arm 77a projecting from one side thereof, which is connected by a rigid rod link 78 with a rocker arm 79 affixed to the rear end of a forwardly extending, elongated rock shaft 80 which is suitably journaled in bearings provided by the rear boom 19 of the frame. The forward end of rock shaft 80 has affixed thereto, an upstanding lever arm 81 which in turn, is connected by a link 82 with the upper end of a rocker arm 83 fixed to a short, forwardly extending rock shaft 84. Rock shaft 84, at its forward end, has affixed thereto, a radial lever arm 85, the outer end of which is connected by a link 86 with the rearwardly extending arm 87a of a bell crank lever 87. Bell crank lever 87 is suitably fulcrumed on a horizontal axis and has its upwardly extending arm 87b diminished and preferably rounded to be embraced by a terminal fork 57b provided by the hydraulic-transmission-control lever 57. The foregoing connections and linkage between the oscillatory control sleeve 77 and lever 57 of the hydraulic transmission, causes the control shaft 57a of the transmission to be oscillated in one direction when sleeve 77 is turned accordingly and to be oscillated in the opposite direction when control sleeve 77 is oppositely oscillated. The oscillatory, small sleeve 77 is yieldingly maintained in neutral position with the hydraulic drive and its relation to power takeoff 53a thereof fluid locked. Such neutral position is maintained by balance springs or other equivalent mechanism provided in the hydraulic transmission within the casing.

The previously recited, longitudinal shifting of control sleeve 77 is for the purpose of releasing from this control member, the retaining dog 69 for shifting the clutch mechanism. To this end, a bell crank lever is fulcrumed on the rear of mounting sleeve 21a, see Fig. 7, having an upstanding arm 88 which engages forwardly of an annular flange 77b of the control sleeve. The lower end of arm 88 is affixed to a horizontal fulcrum pin 88a, to which the second and horizontal arm 88b of the bell crank lever is affixed. The outer end of arm 88b extends above the retaining dog 69 and is connected for operation of said dog by a rigid link rod 88. A contractile spring 90 urges the lower arm 88b of said bell crank lever and consequently, retaining dog 69, downwardly to locking position.

It is extremely important, with our machine that all controls for the variable clutch, driving and variable speed relations, for powering the traction wheels be accessible from one location and controllable by the operator with one hand only. This enables the operator during various operations in felling trees, sawing branches and cutting standing brush, to manipulate the saw unit through the universal swinging movements of the elongated, supporting beam B with the left hand while effecting all controls for the traction wheels from the rock arm or handle post 21c at the extreme rear of the frame.

In the operation of our automotive saw machine over rough terrain, slippery ground, logs and the like, it is very desirable that a highly efficient traction be provided for wheels W. To this end, we have discovered that a lug and chain traction device for each wheel of the type illustrated in the drawings produces excellent results. As shown in Figs. 1 and 3, each wheel is provided with a unit consisting in a series of chain connected, rigid, double lug units. Each lug unit comprises a pair of curved, rigid channel lugs 91 rigidly connected at the ends thereof by rigid side links 92 which are disposed at the sides of the pneumatic tire casing. Thus, a generally rectangular, rigid unit is provided and the several rigid units are interconnected by flexible side chain sections 93. With such structure, the individual channel traction lugs 91 cannot slip circumferentially off the wheel and traction at all times is assured, enabling the wheels to be driven over logs, irregularities and on slippery terrain.

In cutting operations, it is desirable to provide a shield or guard to prevent cut limbs, branches and the like from passing backwardly against the operator. To this end, we provide an upstanding, generally U-shaped guard 94 which may conveniently be constructed from rod material and supported rigidly from the upper cross beam of the cross axle construction. This guard is reinforced and also enhanced in its operation by an upper pair of diagonally, upwardly converging rods 94a connecting the top of the guard proper with the side legs thereof. A second pair of downwardly converging braces 94b interconnect the side legs of guard 94 with the medial portions of the cross axle construction.

For conveniently and universally swinging boom B we provide a heavy, rearwardly projecting handle member 96 rigidly affixed as shown, to the rear and right hand corner of the motor frame 25 positioned in close spaced relation at the extreme rear and right hand side of the machine adjacent the transmission and clutch control post 21.

*Operation*

When the motor or engine E of our machine is started with the boom B disposed and retained in the position shown in Figs. 2, 3 and 4, speed-responsive clutch 45 will throw out driving engagement of the power takeoff 42a with both hydraulic transmission mechanism and the shaft 30 for the twin saw unit until the throttle of the engine or other control is manipulated to obtain operating speed. The twin saws are then revolved in opposite directions and since the finger tip and hand controls have not been actuated or shifted, the gear pump mechanism of the hydraulic transmission will idle, recirculating fluid while the two traction wheels W and W' are fluid-licked by the nature of the hydraulic mechanism.

As previously recited, our automotive saw machine is constructed to efficiently perform a number of different operations. Let us first assume that the operator desires to advance the machine by tractive power and simultaneously clear a path or trail of standing brush, small trees, etc. For this operation, the driver, standing behind the machine first releases the boom-retaining links 27 and 82 whereafter the boom may be swung substantially universally by the operator through manipulation by left hand of the conveniently accessible handle 96, connected with the rear end of the motor frame, forming a part of the general boom B. The operator then desiring forward propulsion of the machine grasps the handle 21c of the control mounting sleeve and with thumb and index finger or with three fingers, turns the hydraulic-control sleeve to the right, thereby causing forward driving of the traction wheels W through connection of said sleeve by linkage and lever with the hydraulic transmission control arm 57, see Figs. 3, 7 and 10. The more the hydraulic control sleeve 77 is turned to the right, the greater is the driving speed ratio for wheels W and W' in a forward direction. As the machine bodily advances the operator with the twin saws 49 and 50 disposed as shown in Fig. 2 swings the elongated forwardly projecting boom B horizontally from side to side and may at the same time, adjust the boom vertically by raising or lowering upon the boom control handle 96. The horizontal swinging of the boom as the machine advances, subject to the finger tip speed control of the operator through hydraulic control sleeve 77, causes all standing brush and small trees to be engaged and cut by the oppositely rotating twin saws, leaving a clear trail of the desired width, within, of course, the swinging limits of boom B.

If in the cutting of brush and trees for clearing a path or other desired area, a large tree is encountered which will require a major cutting operation, the machine may be instantly stopped and the wheels locked by the fluid of the hydraulic mechanism by merely releasing the hydraulic control sleeve 77. The saw unit at the outer end of boom B may then be manipulated with gradual swinging of the boom until the tree is felled. In this connection, it may be desirable to slightly back the machine to approach the tree at a different angle. This may be readily accomplished by the operator turning control sleeve 77 in counterclockwise direction which causes reverse driving of the large traction wheels W and W'.

When turning of the machine is desired, the operator with his right hand upon the horizontal handle 21c of the mounting post sleeve pulls rearwardly upon the control sleeve 77 thereby releasing the retaining dog 69 to permit turning of the mounting sleeve 21a upon the vertical mounting post 21 and then the rigid handle or rock arm 21c may be swung in clockwise or counterclockwise direction for shifting of the clutch elements previously described to cause very sharp turning of the machine in right or left directions. Immediately upon completion of the desired turn, the operator with the dog 69 released turns the mounting sleeve 21a back to normal position, as shown in Figs. 7, 10 and 11 and lets the dog 69 fall to return to lock the clutch control mechanism in a normal position with both right and left hand clutches engaged for driving the wheels W and W'. In this connection the spring 68, urging shift bars 65 and 66 outwardly in opposite directions facilitates return of the mounting sleeve 21a back to normal or central position.

In cutting a path or clearing a predetermined area it is often desirable to remove branches or undergrowth which project laterally or horizontally. For such operations, the saw driving housing 29 is turned through 90 degrees from the full line position shown in Fig. 2 to either one of the vertical positions shown in dotted lines, which may be accomplished by first releasing the dog 32 which engages notches in the retaining collar 29a of tubular housing 29 whereupon torque may be applied to tube 29 by swinging the handle 33 the requisite angulation and then resetting the dog in the appropriate notch. Our automatic saw machine may then be advanced under finger tip control and the operator may swing the boom up and down in substantially a vertical plane for simultaneously cutting limbs, branches and underbrush along vertical lines during the travel of the self-propelled frame.

In all cutting operations, it will be noted that the elongated boom may be universally swung for positioning of the saw unit at the desired elevation and for swinging vertically or horizontally for cutting operations. All this may be accomplished while the machine is propelled forwardly to, in such propelling action, advance the same for cutting. There is therefore, a close cooperation in our automotive saw machine of the propelling mechanism and its controls, the universally mounted beam B and the twin saw unit mounted on the outer and forward end of the boom construction.

In all cutting operations, the mounting of the boom for free swinging with the opposite revolution of the twin saws enables the operator, with a balanced beam, to direct the saw unit for cutting against logs, trees, brush, limbs, felled timber and piled pieces without in any instance, incurring any danger of transmission of torque to the supporting beam or vehicle frame and eliminating jumping, jerking or grabbing action inflicted upon the pieces or trees cut.

The yieldable balancing of the beam B in any adjusted positioned effected through the balancing springs 34 and 38 which influence the cradle 22 in opposite directions, see Figs. 2, 3, 12 and 13, stabilizes the boom in all adjusted positions and is of substantial importance in attaining the high efficiency of our improved machine. Said balancing springs 34 and 38 may be selectively adjusted for proper balancing relation where the twin saws 49 and 50 vary substantially in diameter and consequently, weight. Adjustment of said springs 34 and 38 may be respectively effected by manipulation of the threaded collar 37 and the threaded head piece 41 respectively, see Fig. 3.

It will be noted that with our improved construction the chassis, wheels and frame are so combined with the universal mounting for beam B and the counterbalancing of the twin saw unit by the motor M that the universal connection of cradle 22 with the frame and chassis, has a center of gravity disposed well below the top of the traction wheels W and W' and only a short distance above the axis of said traction wheels. Consequently, the machine will always be stable when travelling over hilly or irregular ground and will not tip forward when going down hill or press backwards excessively on the rear wheels when going up steep slopes. Substantially all weight is impressed upon the traction wheels in our structure to obtain sufficient traction over stumps, logs and irregular terrain. In this connection, the novel anti-skid or traction units comprising the parts 91 and 92 related as disclosed herein, see Figs. 1, 2 and 3 have in use demonstrated highly efficient results for the purposes intended.

The cooperative relation between the elongated, forwardly extending beam B, its low universal mounting upon the cross axle construction of the vehicle frame and the location and arrangement of the clutch and hydraulic transmission controls with the rear caster wheel disposed substantially behind one of the traction wheels, provides for free universal swinging of the beam and twin saw unit mounted on the forward end thereof as well as very convenient manipulation by the operator of all controls, while the machine is advancing or when stationary as in many operations for felling trees and for cutting felled timber. The maneuverability of our sawing machine is materially improved over our inventions previously disclosed in our copending applications, S. N. 87,892 and S. N. 95,332. Sharp turning of the machine, variance in the speed of travel and backing up of the machine is made possible with accommodation of an operator behind the machine where he may watch all cutting operations while manipulating the beam and saw unit with one hand, while controlling the speed of travel, direction of travel and turning with the other hand.

It will of course be understood that various changes may be made in the form, details, arrangement and proportions of the parts without departing from the scope of our invention.

What we claim is:

1. A mobile, self-propelled, power saw machine for cutting standing or felled timber, branches and the like, having in combination a vehicle frame having a cross frame axle structure, a pair of relatively large traction wheels rotatably mounted on opposite sides of said frame upon said axle structure, a single rear wheel of the caster type cooperating to the support of said frame and disposed some distance behind and substantially in line with one of said traction wheels, said frame at its medial portion having a beam-supporting structure disposed with its center extending only slightly above the axis of said large traction wheels, an elongated power-transmitting and saw-supporting beam intermediately mounted upon said supporting structure for unrestricted swinging movement relative thereto and independently of said beam-supporting structure and said vehicle frame upon substantially horizontal and vertical axes, said beam at its forward end extending substantially beyond the front of said frame and said beam at its rear end projecting beyond the rear of said frame and provided with rear means for manipulating the various swinging movements, a pair of rotary disc saw blades supported for revolution on a common axis from the forward end of said beam and positioned closely adjacent each other, said machine having a motor mounted thereon, driving connections supported by said beam for driving said two saw blades from said motor in opposite directions and driving connections between said motor and said traction wheels for controllably driving said wheels forwardly or rearwardly; the combination of said beams, saw mechanism and said frame facilitating horizontal or vertical cutting of timber by swinging of said beam on a selective axis of said beam-support structure without transmission of torque or drag to said frame or beam and without jumping, jerking or grabbing, in its sawing action.

2. A mobile, self-propelled, power saw machine for cutting standing or felled timber, branches and the like, having in combination a vehicle frame having a cross frame axle structure, a pair of relatively large traction wheels rotatably mounted on opposite sides of said frame upon said axle structure, a single rear wheel of the caster type cooperating to the support of said frame and disposed some distance behind and substantially in line with one of said traction wheels, said frame at its medial portion having a beam-supporting structure, an elongated swing-beam intermediately mounted upon and balanced upon said supporting structure for substantially unrestricted, universal swinging movement relative thereto and independently of said beam-supporting structure and said vehicle frame, said beam at its forward end extending substantially beyond the front of said vehicle frame, a pair of rotary disc saws supported for revolution on a common axis from the forward end of said beam and positioned adjacent each other, a motor mounted upon the rear of said beam at least partially counterbalancing said disc saws, a control handle affixed to the rear portion of said beam and extending from adjacent the rear portion of said motor and disposed normally in side by side relation with said rear caster wheel, driving connections supported by said beam for driving said two saw blades in opposite directions from said motor, driving connections between said motor and said traction wheels for controllably driving said wheels forwardly or rearwardly, a mounting member such as a post affixed to the rear of said frame adjacent said rear caster wheel and control elements mounted on said mounting member for convenient accessibility to the operator with one hand while the operator may manipulate the swing beam from its said control handle with the other hand and said control elements affording finger tip, variable speed selective driving of said wheels in forward or rearward direction.

3. A mobile power saw machine for cutting standing or felled timber, branches and the like, having in combination a vehicle frame provided with mobile ground-engaging-supporting means and having a medially disposed beam-supporting structure maintained in a predetermined relation by said ground-engaging-suporting means during mobility of said machine, an elongated swing beam intermediately mounted upon said beam-supporting structure for substantially unrestricted swinging movement relative thereto and independently of said vehicle frame upon substantially horizontal and substantially vertical axes, said beam at its forward end extending substantially beyond the forward end of said frame and projecting beyond said frame at its rear end with manipulating means thereon to facilitate swinging of said beam, a pair of rotary disc saw blades supported for revolution on a common axis from the forward end of said beam and positioned closely adjacent each other, driving connections supported by said beam for driving said two saw blades in opposite directions, stabilizing mechanism for yieldably maintaining said beam in a position of adjustment when swung upon a horizontal axis, said mechanism comprising a pair of oppositely working balance springs, one of said springs urging said beam to swing upon a horizontal axis in clockwise direction and the second of said springs urging said beam to swing in counterclockwise relation upon a horizontal axis.

4. In a mobile power saw machine for cutting timber, branches and the like, an elongated supporting medium mounted for mobility, a pair of rotary saw blades supported for revolution on a common axis from the forward portion of said supporting medium, driving connections mounted upon said supporting medium for driving said two saw blades in opposite directions, said saw blades having opposed concentrically arranged concave portions provided with circularly arranged saw teeth at their marginal edges and mechanism for mounting said saw blades upon said driving connections with limited freedom of relative spacing apart of the most concave portions of said blades whereby the marginal portions or zones disposed inwardly from the peripheral edges of said blades may be maintained in light, opposed contact though revolved in opposite directions to increase efficiency in the cutting of a kerf by joint action.

5. A mobile, self-propelled power machine for cutting standing or felled timber, branches and the like without applying drag or torque upon the timber cut, having in combination a vehicle frame provided with mobile, ground-engaging-supporting means and having mounted thereon a power source and driving connections for selectively driving said ground-engaging-supporting means in forward and reverse directions, said vehicle frame having a medially disposed beam-supporting structure maintained in a predetermined relation to the ground by said ground-engaging-supporting means during mobility of said machine, cradle structure having horizontal trunnion elements journalled in said beam-supporting structure on an axis disposed below the center of gravity of the beam, an elongated power-transmitting and saw-supporting beam intermediately mounted upon said cradle for substantially unrestricted swinging movement on the vertical axis independently of said cradle and the vehicle frame, said beam being substantially balanced upon said cradle, said trunnions providing substantially unrestricted vertical swinging movement of said beam relative to said beam-supporting structure and said vehicle frame, said beam at its forward end extending substantially beyond the forward end of said vehicle frame and having its rearward end disposed at the rear of said vehicle frame and provided with hand manipulating means to facilitate with the balancing thereof substantially universal swinging of said beam independently of said vehicle frame, a pair of rotary disc saw blades mounted in side-by-side coaxial relation and supported from the forward end of said beam, driving connections carried by said beam for driving said two rotary disc blades in opposite directions, said combination of elements facilitating cutting of timber at points substantially forwardly of said frame without application of drag or torque upon the timber cut and without transmission of torque to said beam-supporting structure and to said frame.

6. The structure set forth in claim 5 and instantly controllable driving connections between the said power source and said ground-engagingpropelling means to effect propulsion of the machine forwardly or rearwardly across the ground to assist from travel the sweeping and cutting movement of said blades from said beam.

7. A mobile power saw machine for cutting standing or felled timber, branches and the like, having in combination a vehicle frame provided with mobile, ground-engaging-supporting means and having a medially disposed beam-supporting structure maintained in a predetermined relation by said ground-engaging-supporting means during mobility of said machine, an elongated power-transmitting and saw-supporting beam intermediately mounted upon said beam-supporting structure and substantially balanced thereon and having horizontal trunnions for permitting substantially unrestricted vertical swinging movement of said beam relative to said supporting structure and independent of said frame, means associated with said beam-supporting structure for also permitting substantially unrestricted swinging movement of said beam upon a vertical axis, said beam at its forward end extending substantially beyond the forward end of said frame and projecting at the rear end of said frame and having hand manipulating means to facilitate substantially universal swinging of said beam, a pair of rotary disc saw blades supported for revolution on a common axis from the forward end of said beam and positioned closely adjacent each other, driving connections supported by said beam for driving said two saw blades in opposite directions and mechanism for axially oscillating said beam and retaining the same in a plurality of oscillated positions, said combination of elements facilitating cutting of timber without transmission of torque to said frame and without applying drag or torque upon the timber cut.

References Cited in the file of this patent

UNITED STATES PATENTS

| Number | Name | Date |
|---|---|---|
| 197,688 | Tilton | Nov. 27, 1877 |
| 963,520 | Costello | July 5, 1910 |
| 1,462,764 | Nyquist et al. | July 24, 1923 |
| 1,573,377 | Diehl | Feb. 16, 1926 |
| 1,848,794 | Nicholson et al. | Mar. 8, 1932 |
| 2,224,757 | Wixson | Dec. 10, 1940 |
| 2,429,378 | Stuebner | Oct. 21, 1947 |
| 2,435,192 | Arsneau | Feb. 3, 1948 |
| 2,455,369 | Kuykendall | Dec. 7, 1948 |
| 2,461,188 | Stoner | Feb. 8, 1949 |
| 2,462,314 | Fugua | Feb. 22, 1949 |
| 2,555,428 | Tuttle | June 5, 1951 |
| 2,613,698 | Gregson | Oct. 14, 1952 |

FOREIGN PATENTS

| Number | Country | Date |
|---|---|---|
| 118,817 | Australia | Aug. 14, 1944 |
| 123,039 | Australia | Dec. 6, 1946 |